A. F. STARR.
CORN PLANTER.
APPLICATION FILED MAR. 6, 1912.
1,057,985.
Patented Apr. 1, 1913.
3 SHEETS—SHEET 1.
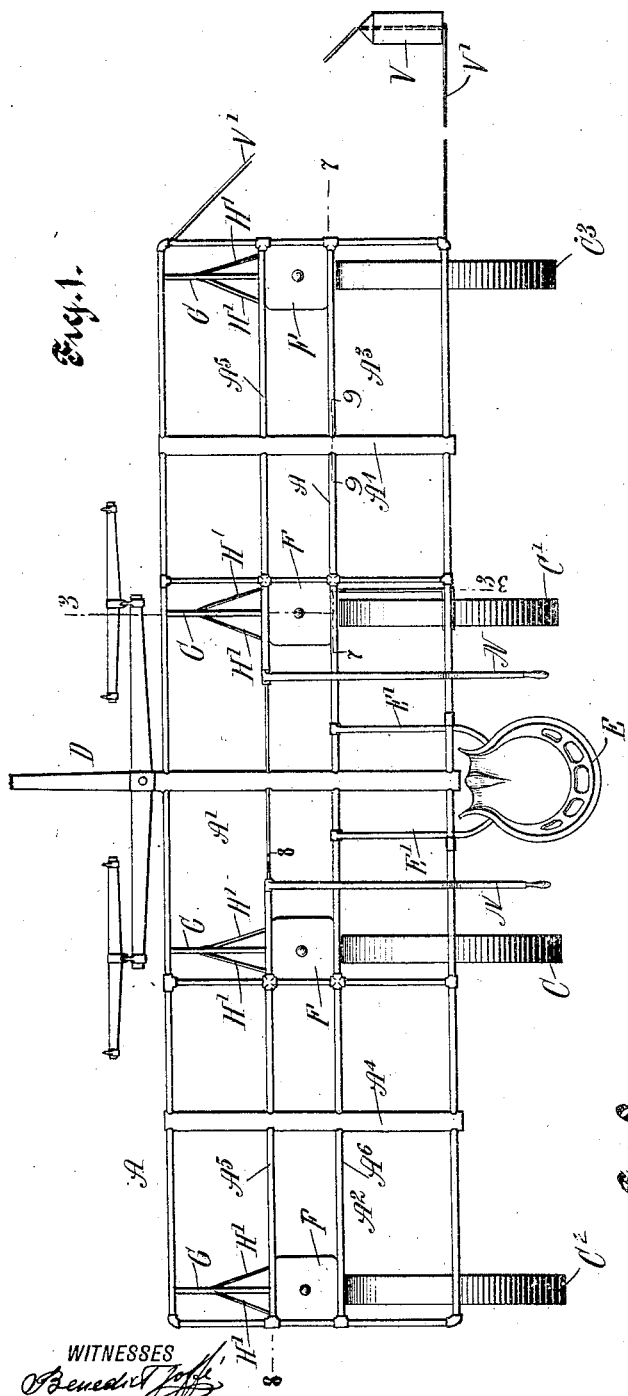
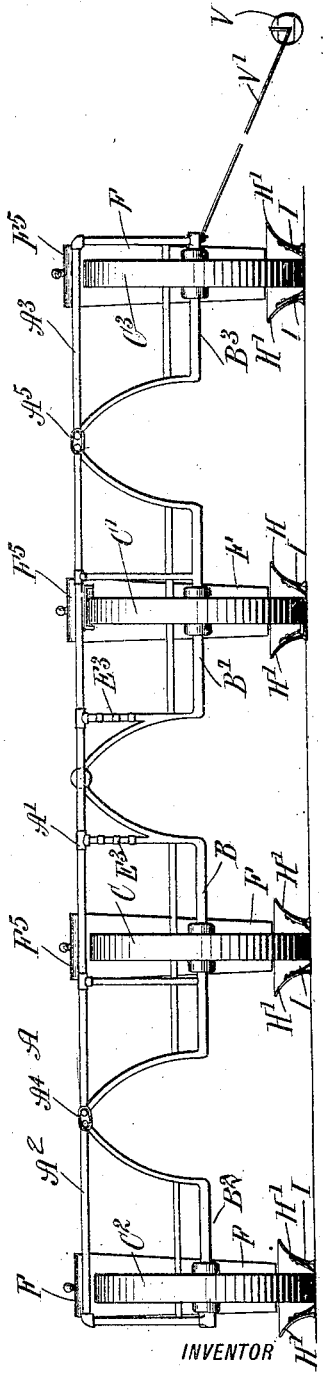
WITNESSES
INVENTOR
Arthur F. Starr
BY
ATTORNEYS A. F. STARR.
CORN PLANTER.
APPLICATION FILED MAR. 6, 1912.
1,057,985.
Patented Apr. 1, 1913
3 SHEETS—SHEET 2.
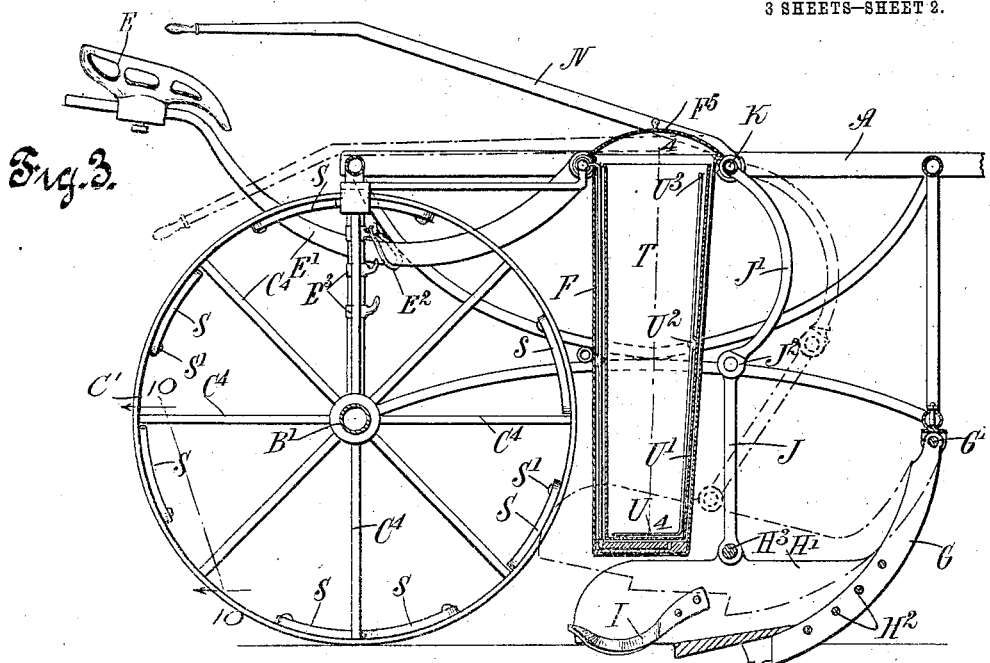
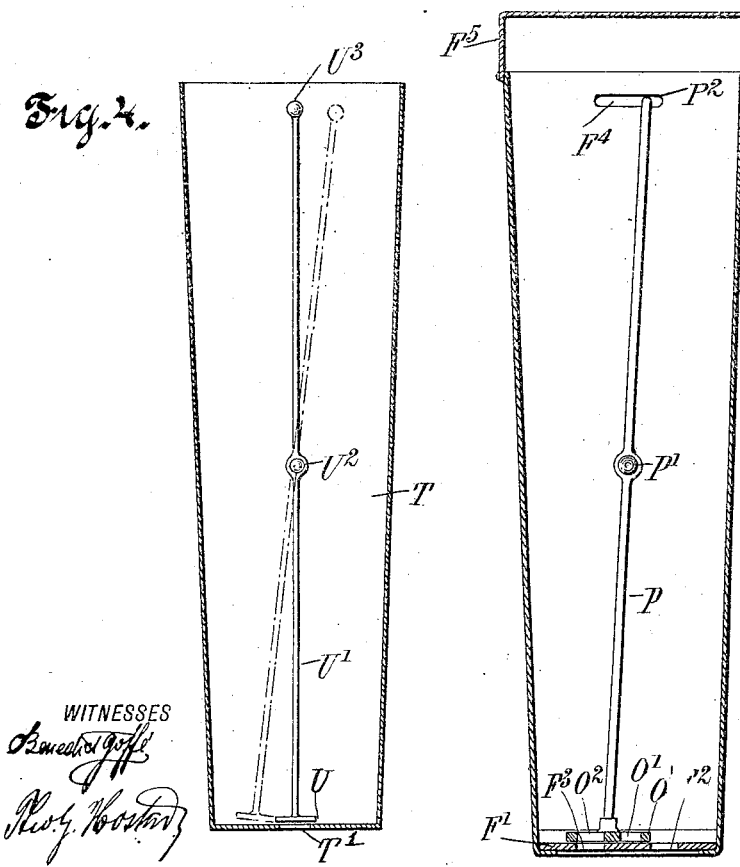
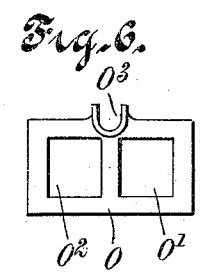
INVENTOR
Arthur F. Starr

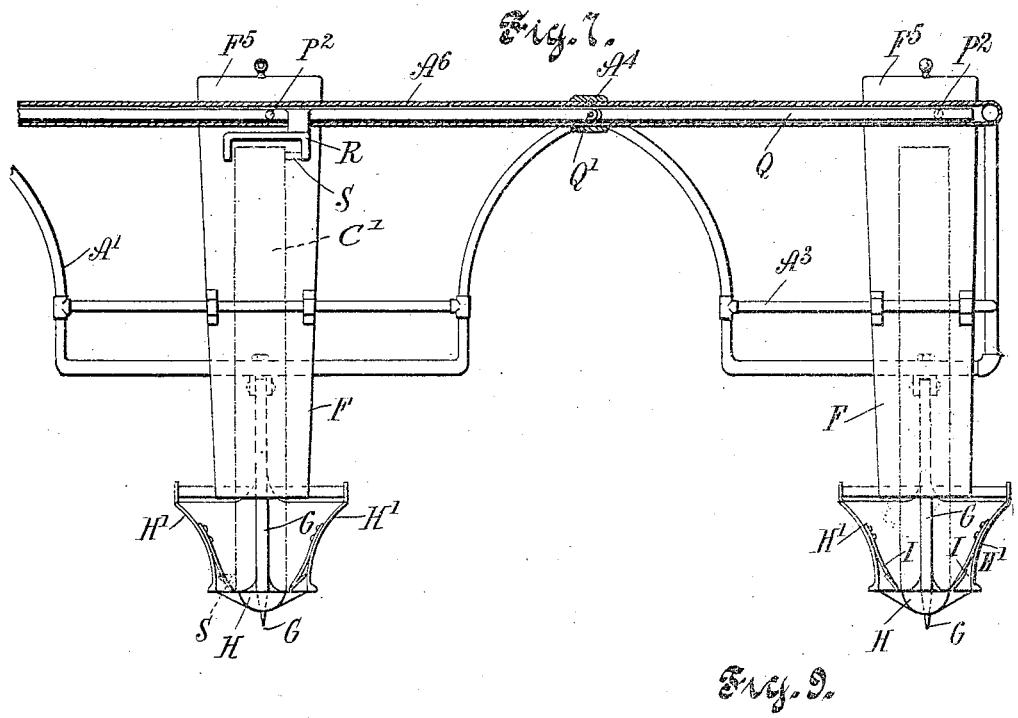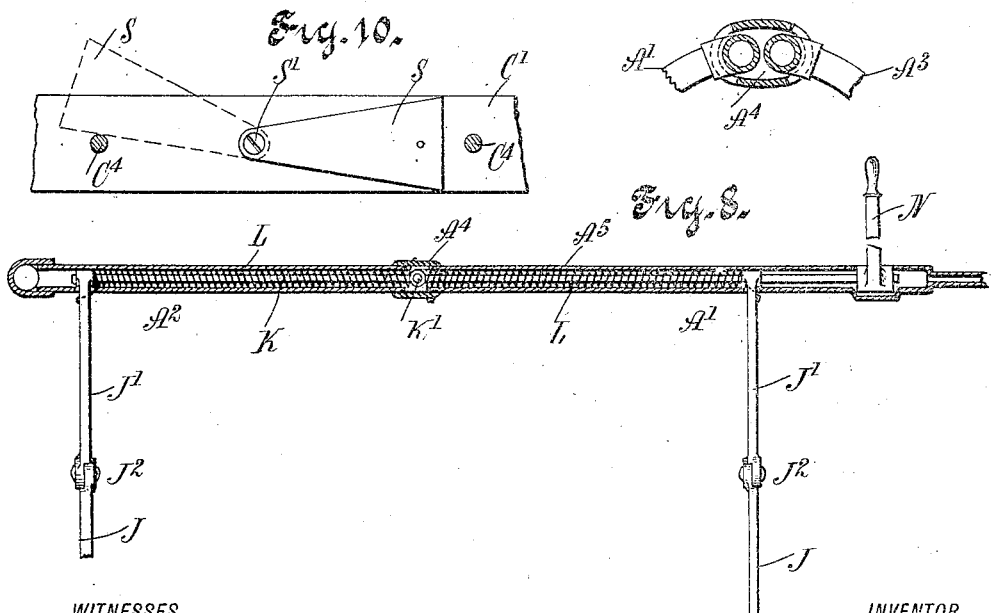

UNITED STATES PATENT OFFICE.

ARTHUR FISK STARR, OF LA MESA, CALIFORNIA.

CORN-PLANTER.

1,057,985.  Specification of Letters Patent.  Patented Apr. 1, 1913.

Application filed March 6, 1912. Serial No. 681,897.

*To all whom it may concern:*

Be it known that I, ARTHUR F. STARR, a citizen of the United States, and a resident of La Mesa, in the county of San Diego and State of California, have invented a new and Improved Corn-Planter, of which the following is a full, clear, and exact description.

The object of the invention is to provide a new and improved corn planter, arranged to plant or drill a plurality of rows at one time, to properly prepare the ground for the reception of the seeds, and to subsequently cover the seed to insure ready germination thereof.

For the purpose mentioned use is made of a frame made in sections, consisting of a middle frame and side frames pivoted to the said middle frame, traction wheels spaced equidistances apart and journaled on the said main frame, one on each side frame and two on the middle frame, draft means connected with said middle frame, a seat carried by the said middle frame, seed boxes supported on the said main frame in front of the traction wheels, shovels or furrow openers supported from the said main frame in front of and below the said seed boxes to form furrows for the seeds to drop in, and covering means carried by the said shovels to cover the furrows in front of the traction wheels.

A practical embodiment of the invention is represented in the accompanying drawings forming a part of this specification, in which similar characters of reference indicate corresponding parts in all the views.

Figure 1 is a plan view of the planter; Fig. 2 is a rear elevation of the same with the seat and its support omitted; Fig. 3 is an enlarged transverse section of the same on the line 3—3 of Fig. 1; Fig. 4 is an enlarged section of the seed-containing vessel taken on line 4—4 of Fig. 3; Fig. 5 is a similar view of the seed box; Fig. 6 is an enlarged plan view of the valve in the bottom of the seed box for controlling the discharge of the seed from the seed box to the ground; Fig. 7 is an enlarged sectional elevation of part of the corn planter, the section being on the line 7—7 of Fig. 1; Fig. 8 is a similar view of another part of the corn planter, the section being on the line 8—8 of Fig. 1; Fig. 9 is an enlarged sectional elevation of one of the joints between the frame sections taken on line 9—9 of Fig. 1; Fig. 10 is an enlarged sectional plan view of a portion of one of the traction wheels showing one operating cam for the seed-feeding device taken on line 10—10 of Fig. 3.

The corn planter is mounted on a main frame A made in sections $A'$, $A^2$, and $A^3$, of which the middle section $A'$ is connected at the sides by hinges $A^4$ with the side sections $A^2$ and $A^3$, and on the frame sections $A'$, $A^2$ and $A^3$ are held axles B $B'$, $B^2$ and $B^3$, on which are mounted to turn the traction wheels C, $C'$, $C^2$ and $C^3$. The traction wheels C, $C'$, $C^2$ and $C^3$ are spaced apart according to the distance between adjacent rows in which the corn or other seed is to be planted, the said traction wheels serving to support the main frame A and the parts carried thereby, at the same time forming covering wheels to press down the ground in the rows after the seed is dropped in the furrows, as hereinafter more fully explained. By the arrangement described the side frames $A^2$ and $A^3$ are free to swing up and down independent of the middle frame $A'$ so that the traction wheels can readily travel over uneven ground for the traction wheels to fulfil the functions above mentioned. The middle section $A'$ of the main frame A is provided with a draft device D of any approved construction for drawing the machine over the field, and the middle section $A'$ also supports a seat E for the operator, the seat being mounted on arms $E'$ extending forwardly and fulcrumed on the middle section $A'$, the arms being engaged by links $E^2$ adapted to be hooked onto hooks $E^3$ located one above the other on vertical portions or supports forming part of the middle section $A'$ of the main frame A. Thus by the arrangement described the seat E can be raised or lowered as desired by engaging a loop $E^2$ with a hook $E^3$ higher up or lower down as the case may be.

In the front of each traction wheel C, $C'$, $C^2$ and $C^3$ is arranged a seed box F. These seed boxes are in a series of which the seed boxes F in front of the traction wheels C and $C'$ are attached to the middle section $A'$ of the frame A, while the seed boxes F in front of the traction wheels $C^2$ and $C^3$ are secured to the frame sections $A^2$ and $A^3$, respectively. In front of each of the seed boxes F is arranged a vertically-disposed cutter G curved downwardly and rearwardly, as plainly indicated in Fig. 3, the upper end of the cutter G being pivotally connected at G' to the corresponding frame section A', A² or A³. From the lower rear end of each cutter G extends rearwardly and downwardly a shovel H, terminating at the sides in mold boards H' bent inwardly toward each other at their forward ends to engage the sides of the cutter G to which the mold boards H' are fastened by bolts H² or other fastening devices. The mold boards H' extend beyond the rear end of each shovel H, and on the inner faces of the mold boards H' for the shovel H are secured the downwardly and rearwardly extending covering plates I curved sidewise, as indicated in Fig. 3, to cover up the furrow made by the shovel H after the seed has been dropped into the furrow, from the corresponding seed box F. The mold boards H' for each shovel H are connected with each other at the top by a cross bar H³ connected with the lower end of a link J connected with a link J' by a rule joint J² to limit the swinging motion of the links J and J' one relative to the other, as will be readily understood by reference to the full and dotted lines shown in Fig. 3. The upper ends of the links J' for the mold boards and cutters in front of the traction wheels C, C² are secured to a shaft K, and the upper ends of the links J' for the mold boards and cutters in front of the traction wheels C' and C³ are similarly attached to the shaft K, and the said shafts K are mounted to turn in hollow members A⁵ forming parts of the sections A², A' and A', A³ of the main frame A. Each of the shafts K (see Fig. 8) is made in sections and the sections are pivotally connected with each other at K' at the joints A⁴ connecting the section A² with the section A', and the section A³ with the section A', and each of the shaft sections K is pressed on by a spring L coiled around the shaft and fastened with one end to the hollow member A⁵, while the other end of the spring is attached to the corresponding link J'. By the arrangement described the springs L tend to hold the links J', J in an uppermost position, and with it the corresponding mold board H', plow H and cutter G. Each of the shafts K is provided at its inner end with a handle N extending adjacent the corresponding side of the seat E, so as to be within convenient reach of the operator seated on the seat E.

Each seed box F is provided with a bottom F' (see Fig. 5) having spaced apertures F², F³, and on the top of the said bottom F' is mounted to slide a valve O provided with two openings O' and O² adapted to alternately register with the apertures F² and F³ in the bottom F'. The valve O is provided with a recess O³ for the reception of the lower end of a lever P, fulcrumed at P' to the inner face of the rear side of the seed box F, and the upper end of the lever P terminates in an angular offset or a pin P² extending through an elongated slot F⁴ formed in the rear side of the seed box F. The offset P² engages a shifting rod Q mounted to slide in a hollow member A⁶ forming part of the main frame A, the shifting rod Q being made in sections pivotally connected with each other at Q' at the joints A⁴ connecting the side frames A² and A³ with the middle frame A', as previously explained. The shifting rod Q (see Fig. 7) is provided with a yoke R extending outside of the member A⁶, and the said yoke R straddles the traction wheel C' which is provided at the inner face of its rim with cams S extending alternately on opposite sides of the traction wheel C' so as to alternately shift the yoke R to the right or to the left and with it the shifting rod Q to impart a simultaneous swinging motion to the several levers P with a view to shift the valves O over the bottoms F' of the seed boxes F. The cams S are pivoted to the rim of the wheel C' at S' intermediate adjacent spokes C⁴, and any one of the cams S can be swung inward into a dormant position, as shown in Fig. 10, or outward into an angular position for engagement with the yoke R, the cam S then resting against one of the spokes C⁴, as will be readily understood by reference to the dotted lines in Fig. 10. It is understood that when only two cams are used they are the ones located diametrically opposite each other, and are swung outward into active position on opposite sides of the traction wheel C', and if more cams are used they are similarly swung outward in pairs to permit of giving any desired number of oscillations to the valve O on each revolution of the traction wheel C'.

Within each of the seed boxes F is adapted to be placed a seed-containing vessel T provided in its bottom with a central opening T' adapted to register with the opening O' or O² in central position at the time, so that the grain contained in the vessel T can pass through the opening T' into the corresponding opening O', O² to fill the same immediately prior to imparting an oscillation to the valve O from the traction wheel C' by the mechanism above described.

It is to be understood that when an opening O' or O² is filled and the valve O is shifted to the right or to the left then it moves in register with the corresponding opening F² or F³ to allow the seed contained in the opening O' or O² to drop through the opening F² or F³ down into the furrow made by the shovel H.

It is to be understood that the seed drops immediately in the rear of the shovel H and in front of the covering plates I, so that the seeds after being dropped into the furrow are covered up with ground moved inward by the covering plates I and the covering ground is pressed downward by the subsequent passage of the corresponding traction wheel C, C', C² or C³ passing over the crest of the row.

The opening T' in the vessel T is adapted to be closed by a valve U held on the lower end of a lever U' fulcrumed at U² on one side of the vessel T, and the upper end of the lever U' is provided with a handle U³ under the control of the operator for imparting a swinging motion to the lever U' with a view to move the valve U into an open or a closed position relative to the opening T'.

It is to be understood that when the vessel T is emptied it can be readily removed from the seed box F and refilled with seed, with the valve U in closed position, and then the filled vessel T is returned to the seed box F and the valve U is opened by the operator pushing the handle U³ to one side so that the grain can pass through the opening T' into the corresponding opening O' or O² of the valve O, as previously explained. The seed box F is normally closed by a hinged cover F⁵, which can be readily opened whenever it is desired to remove an empty vessel T from the seed box F or replacing the filled vessel T in the seed box F.

When the machine is drawn forward over the field by a team attached to the draft device D then the traction wheel C' actuates the several valves O to allow the seed to drop into the furrows formed by the shovel H, in advance of which travels the cutter G to loosen the ground.

It is to be understood that the shovel H forms a furrow while the mold boards H' serve to move stones, stumps and the like away from the furrows, and the covering plates I cover up the seeds, which are subsequently pressed downward by the traction wheels C, C', C² and C³.

By the operator manipulating the handles N the furrow may be given more or less depth, as desired, according to the nature of the soil.

The machine shown and described is very simple and durable in construction, and four rows of seed can be planted at once, and the seed-containing vessels T can be readily removed and refilled whenever it is necessary to do so.

Having thus described my invention, I claim as new and desire to secure by Letters Patent:

1. A planting machine provided with a fixed seed box having an apertured bottom, a valve movable over the said bottom and having openings adapted to alternately register with the apertures of the said bottom, a vessel for containing the seed and adapted to be set into the said receptacle, the vessel having an opening in its bottom, and a manually-controlled valve operating in conjunction with the apertured bottom of the said vessel.

2. A planting machine provided with a fixed seed box having an apertured bottom, a valve movable on the said bottom and having openings adapted to alternately register with the apertures of the said bottom, means for automatically moving said valve, a vessel for containing the seed and adapted to be set into the said receptacle the vessel having an opening in its bottom, and a manually controlled valve operating in conjunction with the apertured bottom of said vessel.

3. A planting machine comprising a wheeled frame, seed boxes supported on the frame, valves controlling the discharge of seed from said boxes, an operating member having connection with the said valves for actuating the same, actuating members carried by one of the frame wheels and independently movable to and from operative positions, and a member carried by the operating member and with which the said actuating members are engageable when in operative positions.

4. A planting machine comprising a wheeled frame, seed boxes supported on the machine and having apertured bottoms, feed valves operating over the apertured bottoms of the boxes, levers fulcrumed in the said boxes and having one end engaging the said valves, an operating rod mounted to slide in the frame and having connection with the other ends of the said levers, a yoke on the operating rod, and actuating cams carried by one of the frame wheels and independently movable to an operative position whereby to engage the said yoke and shift the operating rod alternately in opposite directions.

In testimony whereof I have signed my name to this specification in the presence of two subscribing witnesses.

ARTHUR FISK STARR.

Witnesses:
 EDGAR A. LUCE,
 Mrs. H. D. MACDONALD.